US012625527B2

(12) United States Patent
Matsui et al.

(10) Patent No.: US 12,625,527 B2
(45) Date of Patent: May 12, 2026

(54) INFORMATION PROCESSING APPARATUS

(71) Applicant: NEC Corporation, Tokyo (JP)

(72) Inventors: Takahiro Matsui, Tokyo (JP);
Hironobu Mochizuki, Kanagawa (JP);
Naoto Ota, Kanagawa (JP); **Yoshifumi
Tanii, Tokyo (JP); Takashi Miyazaki**,
Tokyo (JP); Satoshi Yamaguchi, Tokyo
(JP); Shinji Funai, Tokyo (JP)

(73) Assignee: NEC CORPORATION, Tokyo (JP)

( * ) Notice: Subject to any disclaimer, the term of this
patent is extended or adjusted under 35
U.S.C. 154(b) by 303 days.

(21) Appl. No.: 18/281,340

(22) PCT Filed: Mar. 16, 2021

(86) PCT No.: PCT/JP2021/010541
§ 371 (c)(1),
(2) Date: Sep. 11, 2023

(87) PCT Pub. No.: WO2022/195704
PCT Pub. Date: Sep. 22, 2022

(65) Prior Publication Data
US 2024/0160255 A1 May 16, 2024

(51) Int. Cl.
*G06F 1/16* (2006.01)
(52) U.S. Cl.
CPC .......... *G06F 1/1698* (2013.01); *G06F 1/1683*
(2013.01)
(58) Field of Classification Search
CPC .... G06F 1/1698; G06F 1/1683; G06F 1/1605;
G06F 1/1601; G06F 1/16; H04W 84/047
See application file for complete search history.

(56) References Cited

U.S. PATENT DOCUMENTS

2021/0073155 A1*   3/2021  DeCamp ................ F16M 11/10
2021/0397214 A1*  12/2021  Yamamoto ........... F16M 11/126

FOREIGN PATENT DOCUMENTS

JP      2000-341018 A    12/2000
JP      2002-009691 A     1/2002
JP      2007-317233 A    12/2007

OTHER PUBLICATIONS

JP Office Action for JP Application No. 2023-506427, mailed on Jul.
23, 2024 with English Translation.
International Search Report for PCT Application No. PCT/JP2021/
010541, mailed on May 25, 2021.

* cited by examiner

*Primary Examiner* — Ayodeji O Ayotunde
(74) *Attorney, Agent, or Firm* — Sughrue Mion, PLLC

(57) ABSTRACT

An information processing apparatus (10) includes a display
(110), a housing (120), and a wireless relay apparatus (130).
A control unit is provided inside the housing (120). The
control unit includes, for example, a central processing unit
(CPU), and performs various pieces of arithmetic processing
and control processing. One example of the control process-
ing is control of the display (110). The display (110) is
mounted to the housing (120). The wireless relay apparatus
(130) is mounted to any surface in surfaces of the housing
(120). As one example, the display (110) and the wireless
relay apparatus (130) are each mounted to a side surface of
the housing (120).

12 Claims, 16 Drawing Sheets

10

DISPLAY — 110
120

124
POWER SUPPLY CIRCUIT

CONTROL UNIT (INFORMATION PROCESSING UNIT) — 122

130
WIRELESS RELAY APPARATUS — WIRELESS TERMINAL

160

WIRED LINE

Figure 10:
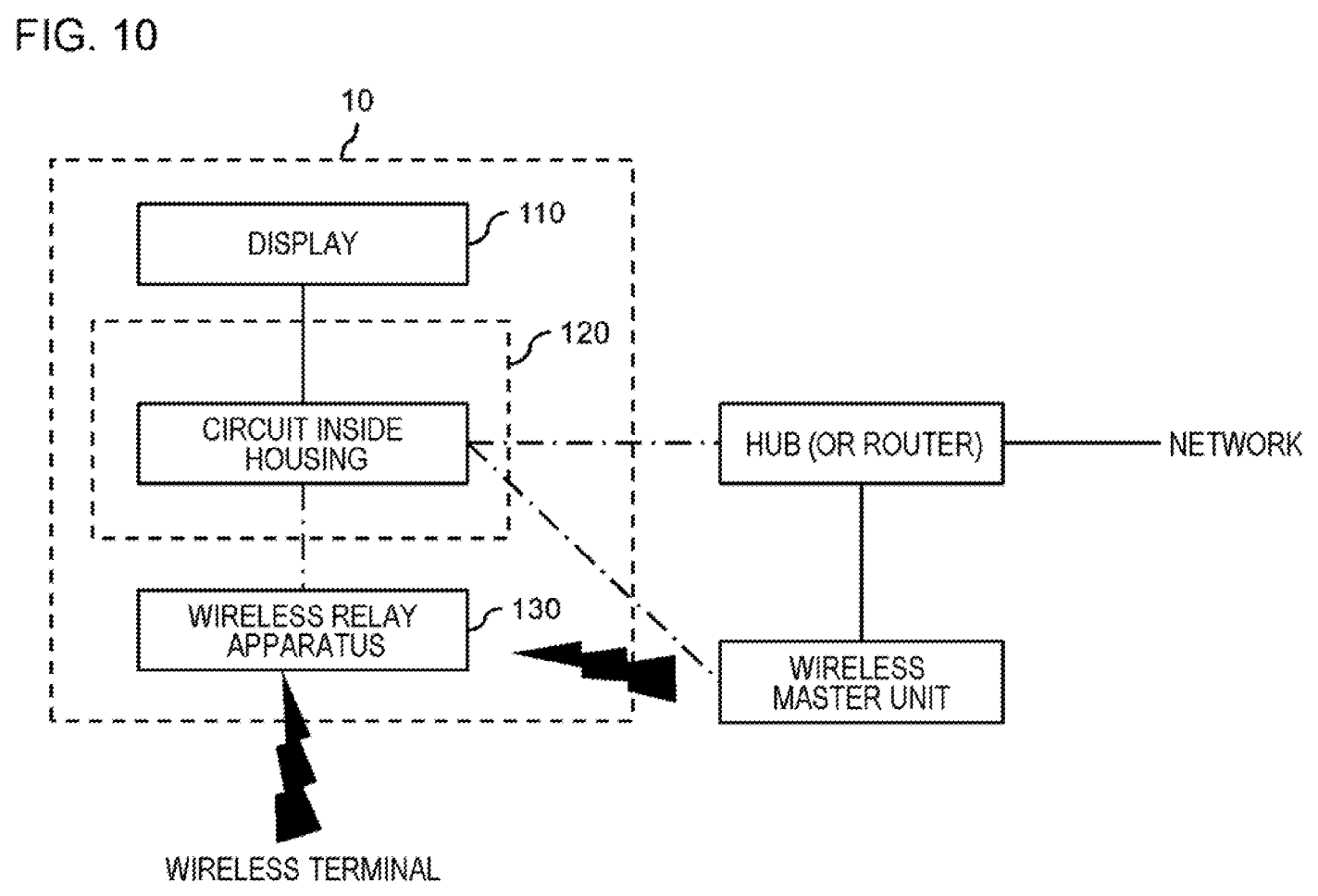

NETWORK

HUB (OR ROUTER)

WIRELESS MASTER UNIT

DISPLAY

CIRCUIT INSIDE HOUSING

WIRELESS RELAY APPARATUS

WIRELESS TERMINAL

Figure 11:
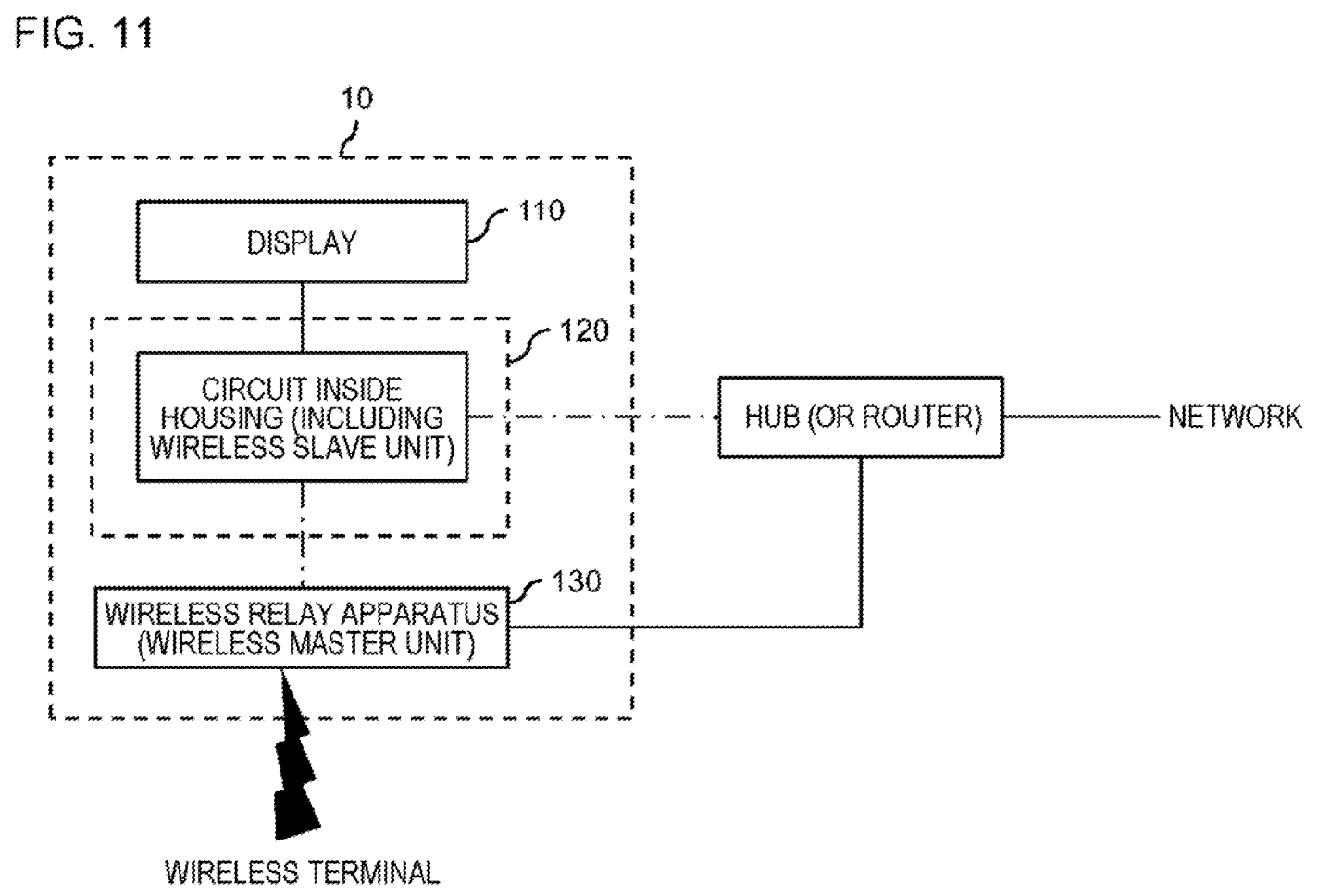

NETWORK

HUB (OR ROUTER)

10

110 DISPLAY

120 CIRCUIT INSIDE HOUSING (INCLUDING WIRELESS SLAVE UNIT)

130 WIRELESS RELAY APPARATUS (WIRELESS MASTER UNIT)

WIRELESS TERMINAL

FIG. 13

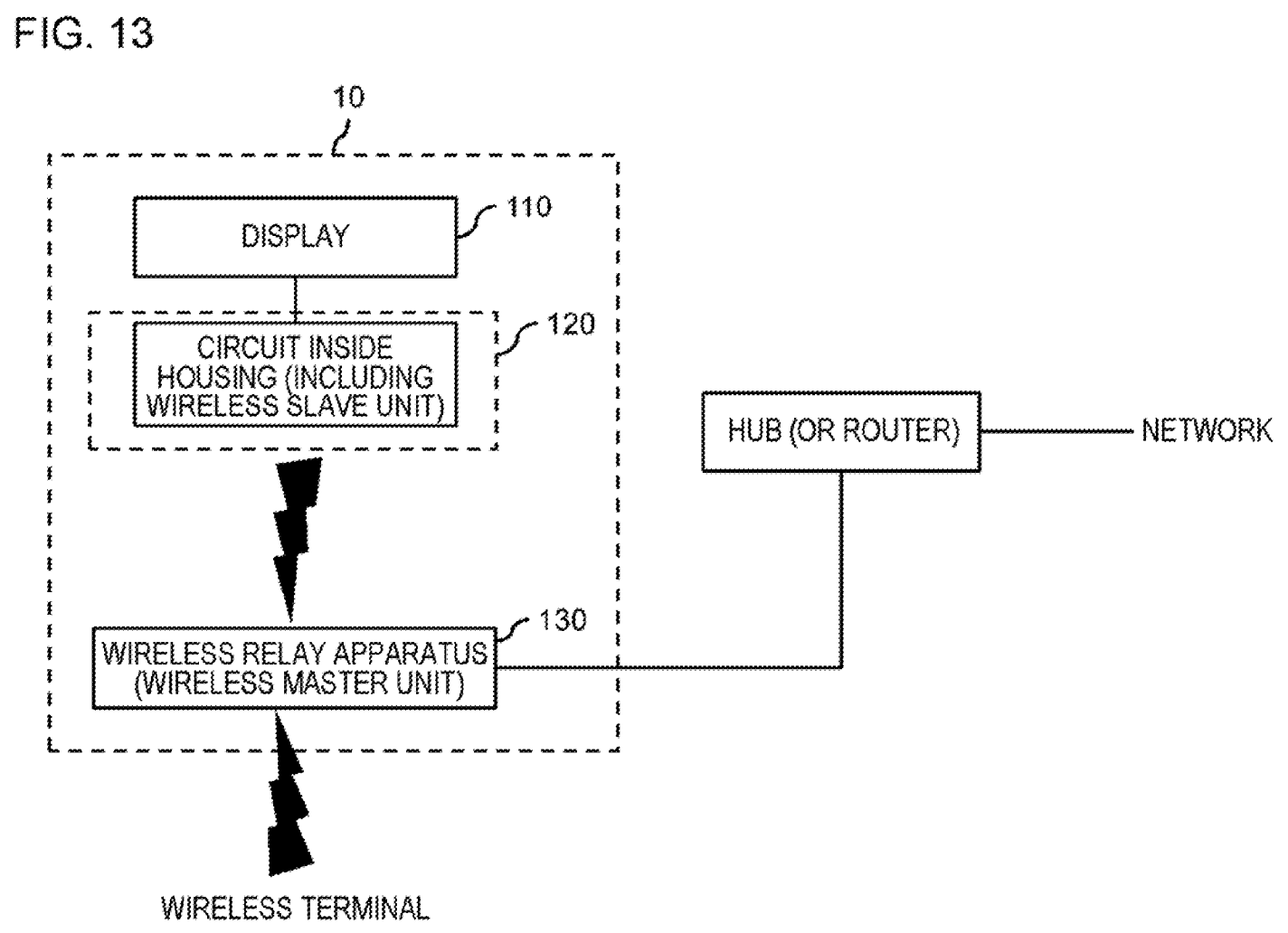

NETWORK

HUB (OR ROUTER)

10

DISPLAY — 110

CIRCUIT INSIDE HOUSING (INCLUDING WIRELESS SLAVE UNIT) — 120

WIRELESS RELAY APPARATUS (WIRELESS MASTER UNIT) — 130

WIRELESS TERMINAL

FIG. 14

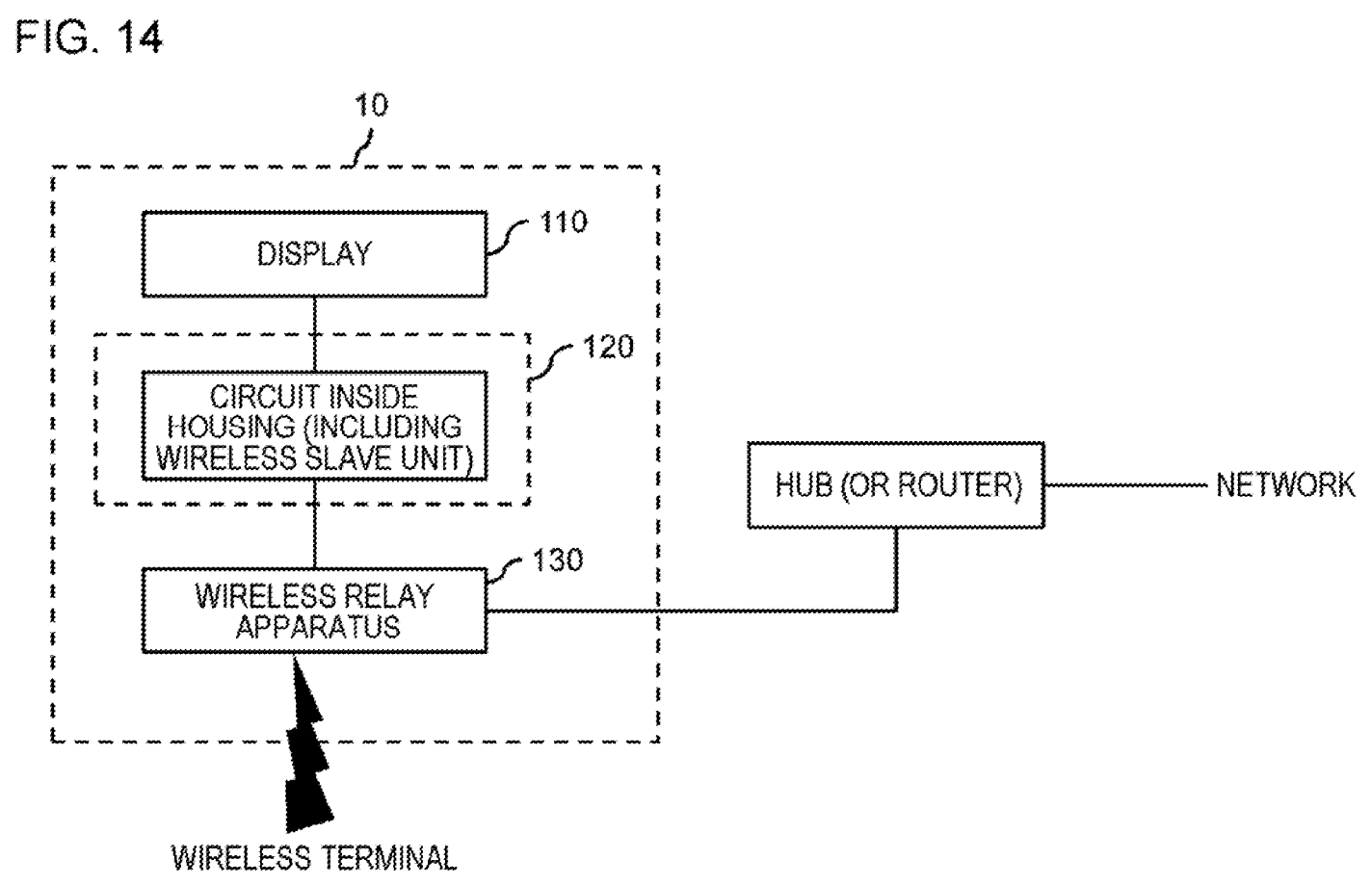

NETWORK

HUB (OR ROUTER)

10

110 DISPLAY

120 CIRCUIT INSIDE HOUSING (INCLUDING WIRELESS SLAVE UNIT)

130 WIRELESS RELAY APPARATUS

WIRELESS TERMINAL

FIG. 15

NETWORK

DISPLAY 110

CIRCUIT INSIDE HOUSING (INCLUDING WIRELESS SLAVE UNIT) 120

HUB (OR ROUTER)

10

INFORMATION PROCESSING APPARATUS

This application is a National Stage Entry of PCT/JP2021/010541 filed on Mar. 16, 2021, the contents of all of which are incorporated herein by reference, in their entirety.

TECHNICAL FIELD

The present invention relates to an information processing apparatus.

BACKGROUND ART

In recent years, a computer has been used in various places. Moreover, with development of a wireless communication technique, various terminals are increasingly connected to a communication line wirelessly. Patent Document 1 describes integrating a server that accumulates information to be distributed, with a wireless base station.

RELATED DOCUMENT

Patent Document

Patent Document 1: Japanese Patent Application Publication No. 2002-9691

SUMMARY OF THE INVENTION

Technical Problem

An information processing apparatus is generally used together with a display. Moreover, a wireless terminal is used in various places. When a wireless terminal is used, a wireless relay apparatus that connects the wireless terminal to a communication line needs to be placed within a communication range of the wireless terminal. When an information processing apparatus and a wireless terminal are used in the same area, a possibility that relative positions of a display and the information processing apparatus, and a wireless relay apparatus becomes close is high. Herein, when the display, the information processing apparatus, and the wireless relay apparatus are separately installed, a space occupied thereby becomes large. Moreover, when a wireless relay apparatus is incorporated in a housing of an information processing apparatus as described in Patent Document 1, a need to enlarge a size of the housing arises, and, therefore, a space to be needed becomes large accordingly.

One example of an object of the present invention is to make, when installing a display, an information processing apparatus, and a wireless relay apparatus, a space needed for installation thereof small.

Solution to Problem

The present invention provides an information processing apparatus including:

a housing;

a display mounted to a housing;

a control unit, housed inside a housing, that controls a display; and a wireless relay apparatus mounted to any surface in surfaces of the housing.

Advantageous Effects of Invention

According to the present invention, when a display, an information processing apparatus, and a wireless relay apparatus are installed, a space needed for installation thereof becomes small.

BRIEF DESCRIPTION OF THE DRAWINGS

The above-described object, other objects, features, and advantageous effects will become more apparent from a preferred example embodiment described below and the following accompanying drawings.

FIG. 10 is a view illustrating a connection example of the information processing apparatus and peripheral equipment.

FIG. 11 is a view illustrating a connection example of the information processing apparatus and peripheral equipment.

FIG. 13 is a view illustrating a connection example of the information processing apparatus and peripheral equipment.

FIG. 14 is a view illustrating a connection example of the information processing apparatus and peripheral equipment.

FIG. 15 is a view illustrating a modified example of FIG. 14.

EXAMPLE EMBODIMENT

Hereinafter, example embodiments of the present invention are described by use of the drawings. Note that, a similar reference sign is assigned to a similar component in all the drawings, and description is omitted as appropriate.

First Example Embodiment

Figure 1:
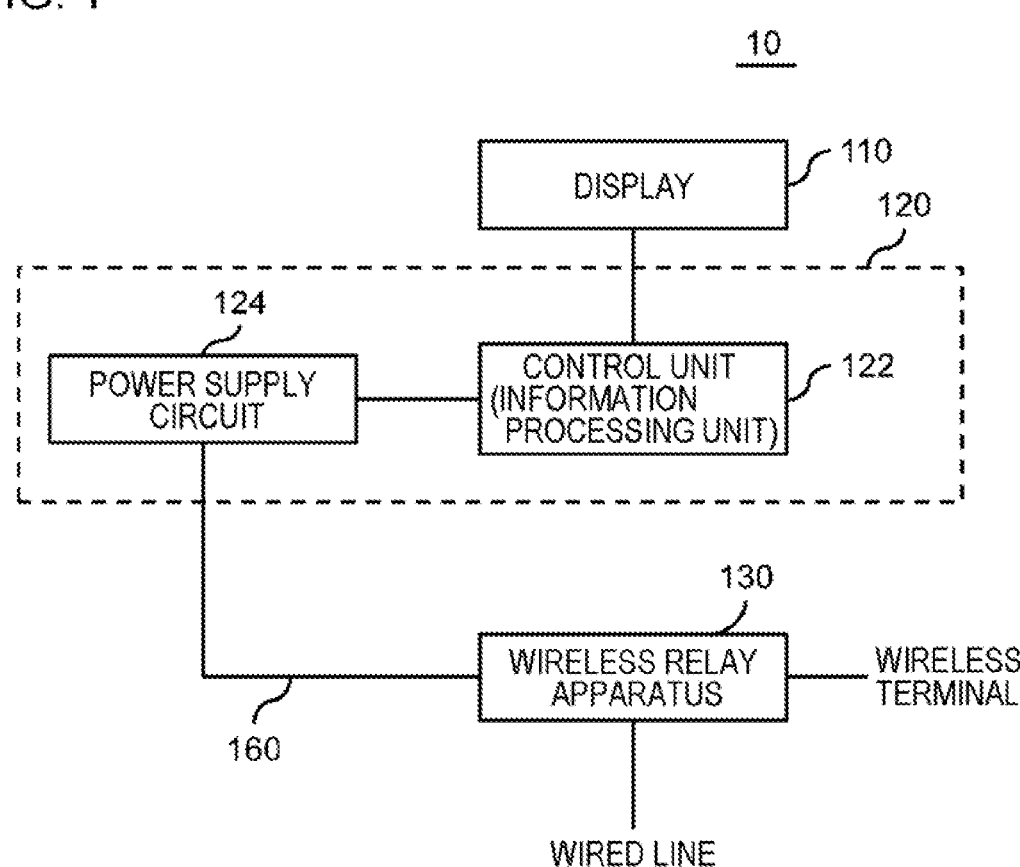
FIG. 1 is a view illustrating one example of a functional configuration of an information processing apparatus according to a first example embodiment.
Figure 2:
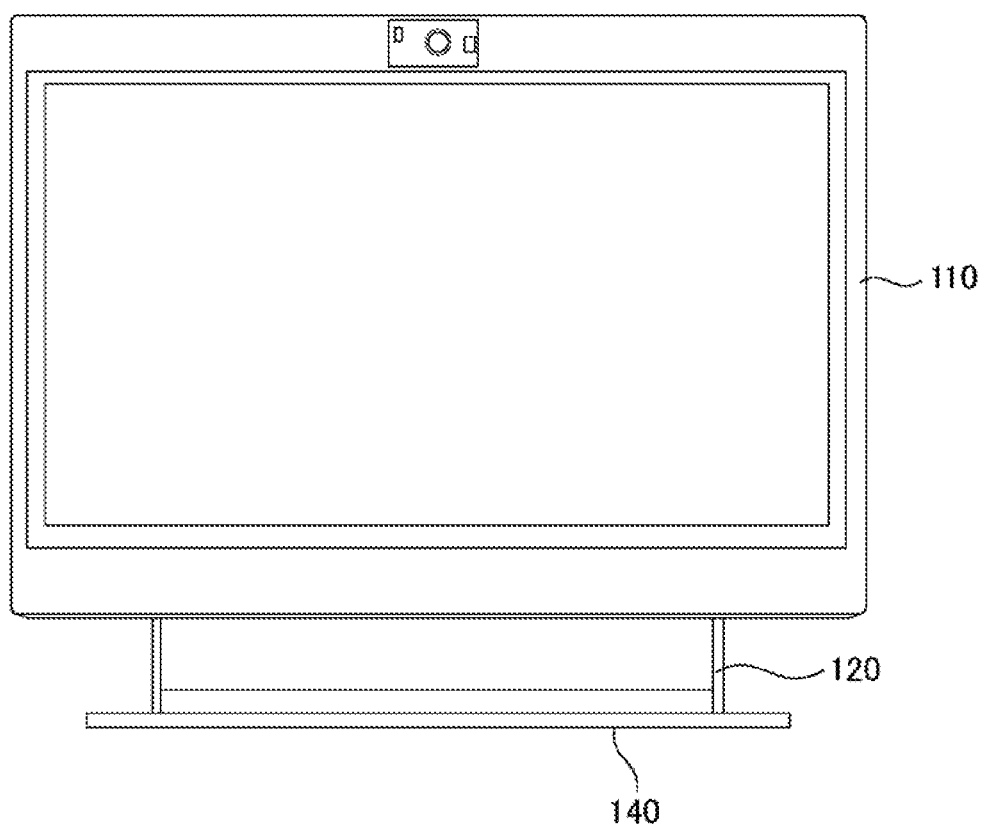
FIG. 2 is a front view of the information processing apparatus.
Figure 3:
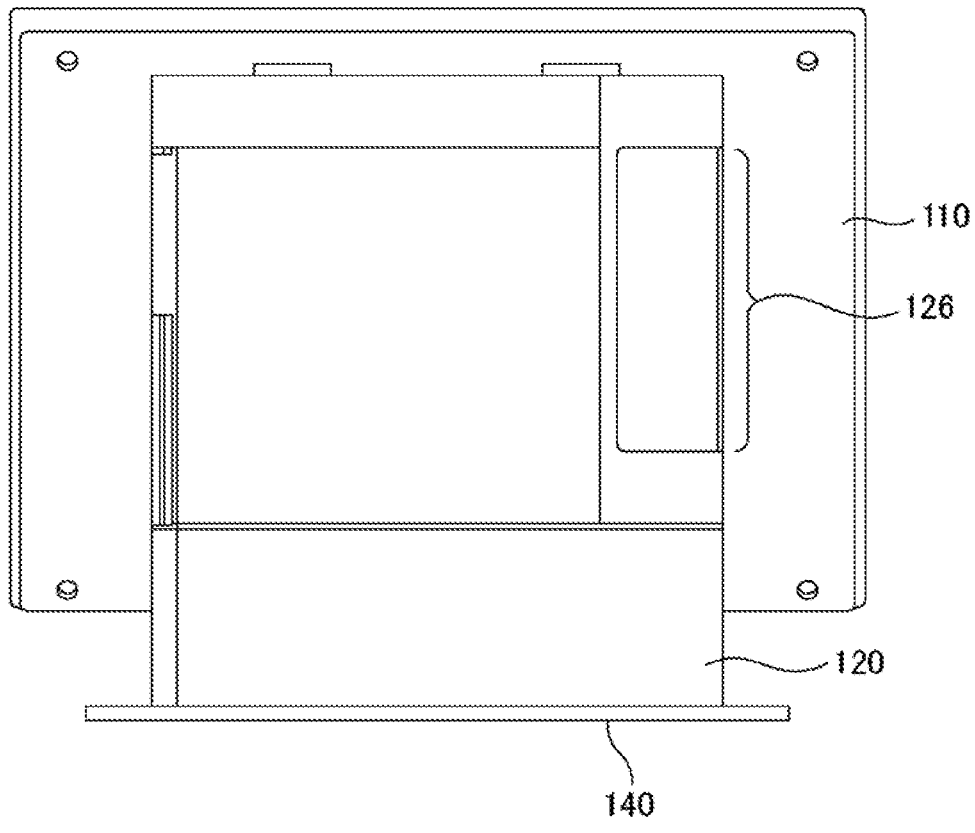
FIG. 3 is a rear view of the information processing apparatus.
Figure 4:
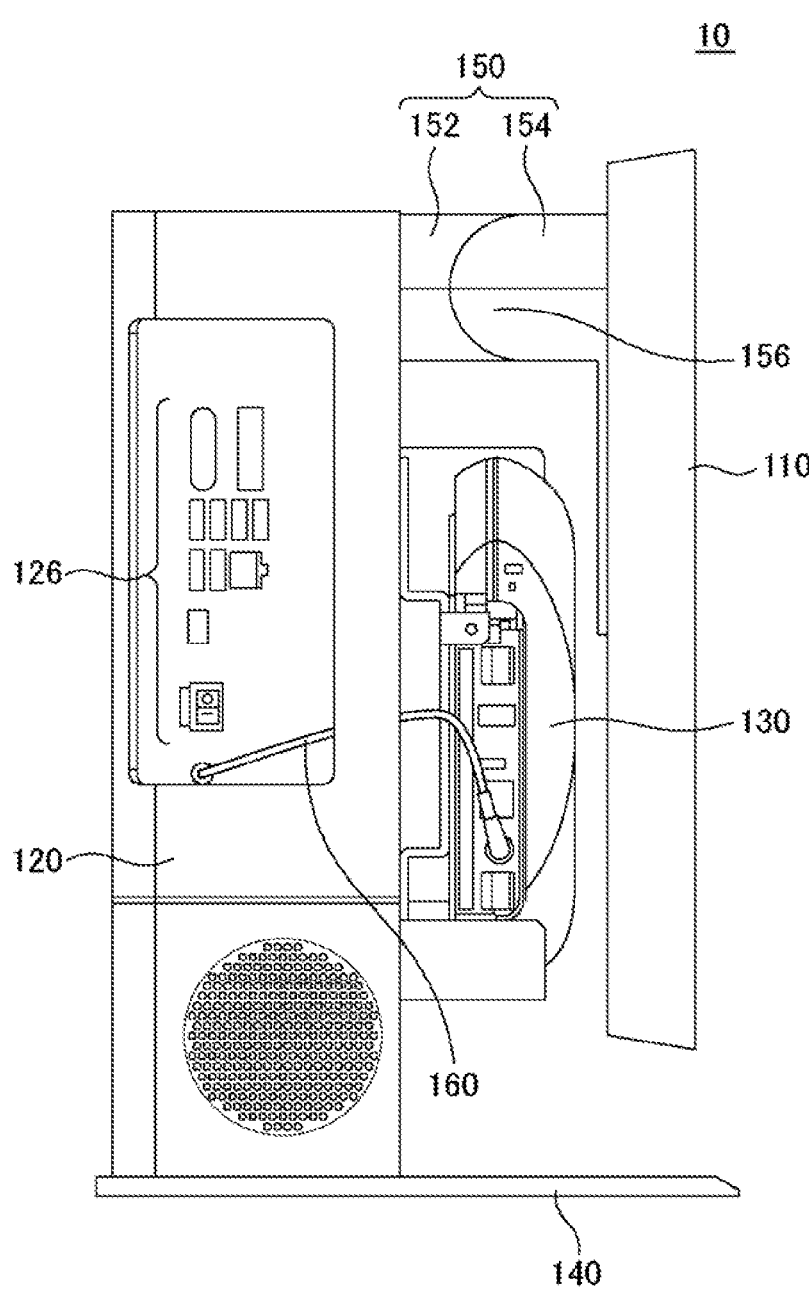
FIG. 4 is a side view of the information processing apparatus.
Figure 5:
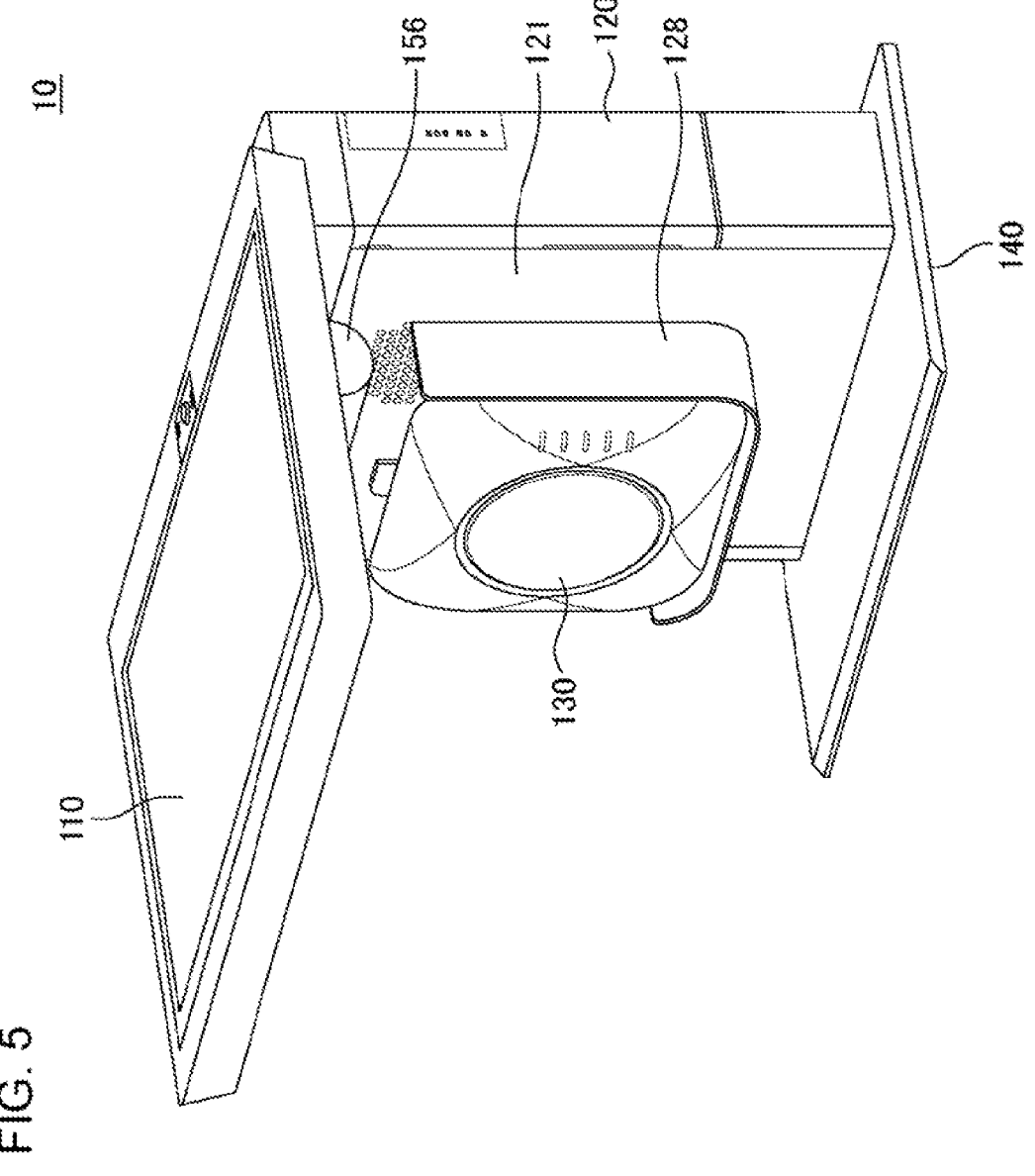
FIG. 5 is a perspective view of the information processing apparatus.
Figure 6:
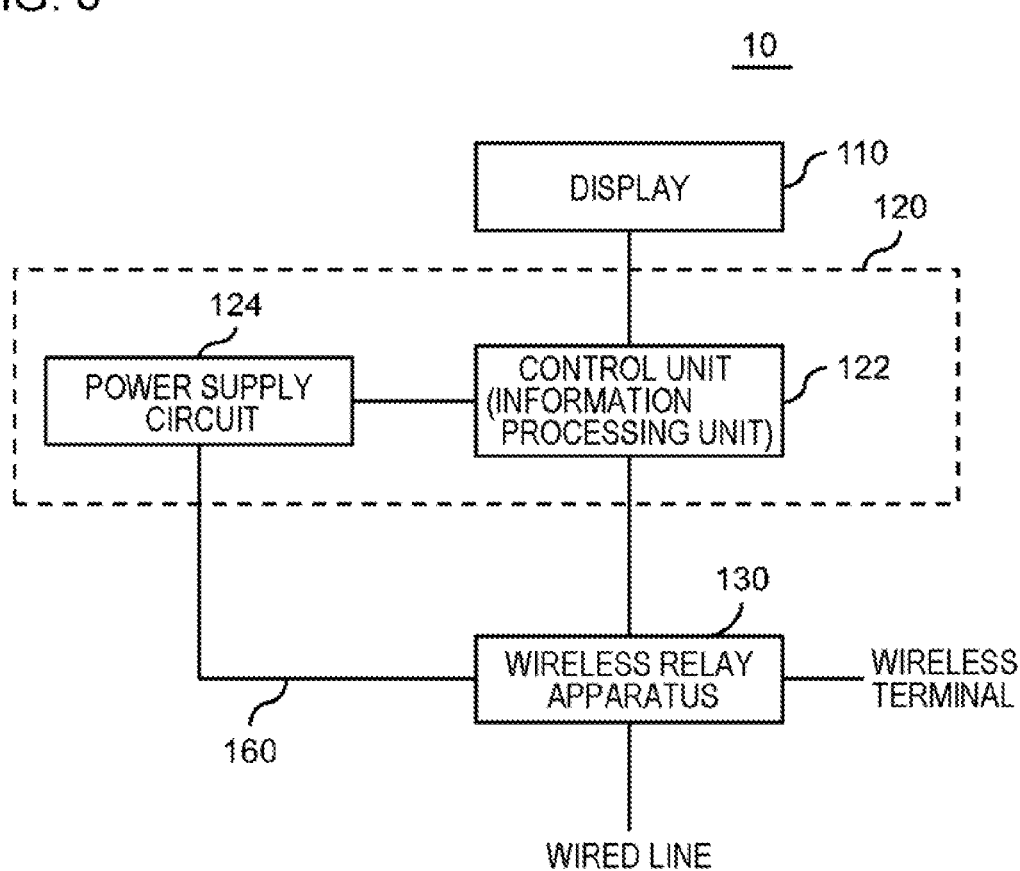
FIG. 6 is a view illustrating a modified example of FIG. 1.
Figure 7:
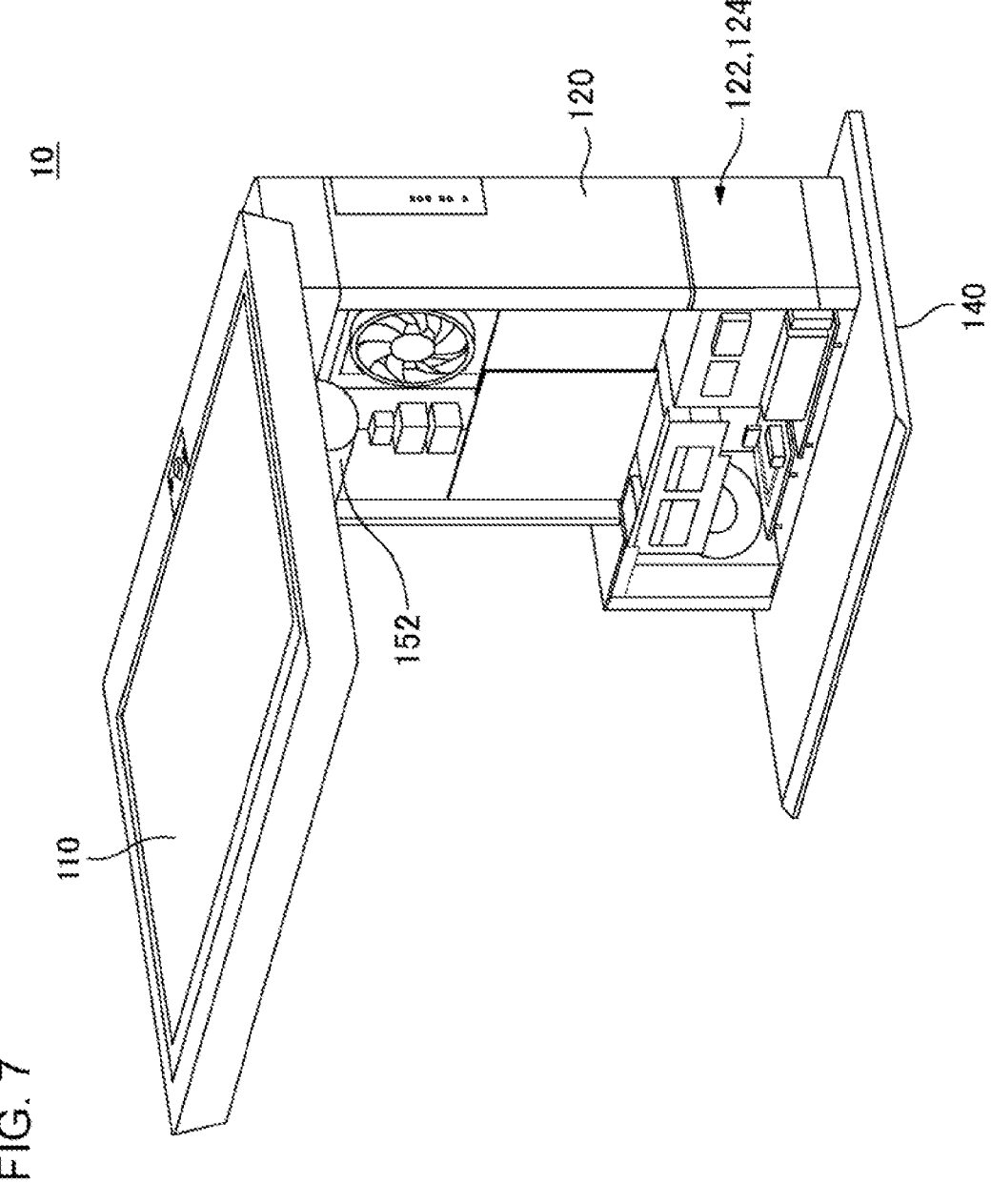
FIG. 7 is a view illustrating a state in which a part of one surface of a housing is removed.

FIG. 1 is a view illustrating one example of a functional configuration of an information processing apparatus 10 according to the present example embodiment. FIG. 2 is a front view of the information processing apparatus 10, FIG. 3 is a rear view of the information processing apparatus 10, and FIG. 4 is a side view of the information processing apparatus 10. Moreover, FIG. 5 is a perspective view of the information processing apparatus 10. In FIG. 5, a display 110 faces upward. FIG. 6 is a view illustrating a modified example of FIG. 1. FIG. 7 is a view illustrating a state in which a part of one surface 121 of a housing 120 is removed.

As illustrated in FIGS. 1 to 5, the information processing apparatus 10 includes the display 110, the housing 120, and a wireless relay apparatus 130. As illustrated in FIG. 1, a control unit 122 is provided inside the housing 120. The control unit 122 includes, for example, a central processing unit (CPU), and performs various arithmetic processing and control processing. One example of the control processing is control of the display 110. As illustrated in FIGS. 2 to 5, the display 110 is mounted to the housing 120. The wireless relay apparatus 130 is mounted to any surface in surfaces of housing 120. In the present example embodiment, the display 110 and the wireless relay apparatus 130 are each mounted to a side surface of the housing 120. The information processing apparatus 10 is described in detail below.

The housing 120 is, for example, a housing of a desktop type computer. Then, various electronic components constituting the computer, such as a CPU, a memory, and a storage device are housed inside the housing 120. One example of the computer is a store computer that manages a product in a store, but the computer may also be used for another purpose (e.g. a POS terminal or a personal terminal).

The display 110 is mounted to the housing 120. In an example illustrated in each of FIGS. 2 to 5, the display 110 is mounted to the surface of the housing 120 in such a way as to face the widest surface (hereinafter, referred to as one surface 121) of the housing 120. A longitudinal length of the display 110 is only slightly smaller than a height of the one surface 121. Moreover, a lateral width of the display 110 may be larger than a lateral width of the one surface 121, but may be smaller than a lateral width of the one surface 121. In the example illustrated in the present figure, the display 110 is movably mounted relative to the housing 120.

Specifically, as illustrated in FIGS. 4 and 5, the display 110 is mounted to the one surface 121 of the housing 120 via the connection portion 150. More specifically, the connection portion 150 includes a first member 152 and a second member 154. The first member 152 is fixed to the one surface 121 of the housing 120, and the second member 154 is fixed to a rear surface of the display 110. Then, the first member 152 and the second member 154 are coupled to each other via a hinge portion 156.

The hinge portion 156 is provided along an upper side of the display 110. Moreover, the hinge portion 156 also extends along an upper side of the one surface 121. Thus, the display 110 is rotatable relative to the housing 120 with the upper side of the display 110 as a rotation center. Note that, the hinge portion 156 may be provided along another side (e.g. a lateral side) of the display 110.

The hinge portion 156 may have a lock mechanism. The lock mechanism fixes the hinge portion 156 at a predetermined angle (or desired angle). By providing the lock mechanism, an angle of the display 110 can be fixed at a predetermined angle or any angle desired by a user. As one example, the hinge portion 156 is fixed by a lock mechanism when the display 110 does not need to be rotated (e.g. when maintenance or the like of the information processing apparatus 10 or the wireless relay apparatus 130 is not needed). Moreover, when the display 110 needs to be rotated (e.g. when maintenance or the like of the information processing apparatus 10 or the wireless relay apparatus 130 is needed), the lock mechanism of the hinge portion 156 is released, and the display 110 becomes rotatable. Note that, when the display 110 is fixed at a predetermined angle, the predetermined angle is, for example, each of a state in which the display 110 has become vertical and a state in which the display 110 faces upward (e.g. equal to or more than being horizontal), but is not limited thereto.

Note that, when the hinge portion 156 does not have a lock mechanism, the hinge portion 156 is always rotatable.

Moreover, in the example illustrated in the present figure, there is a gap between the one surface 121 of the display 110 and the housing 120. The wireless relay apparatus 130 is fixed to the one surface 121, and therefore included in the gap. In other words, the wireless relay apparatus 130 is positioned between the display 110 and the housing 120 in a state where the display 110 is used.

The wireless relay apparatus 130 is, for example, a wireless access point, a wireless LAN router, a wireless relay, a HUB, a router, or a separator, and communicates with a wireless terminal, for example, according to a communication standard such as WiFi (registered trademark). A wireless terminal used herein may be, for example, a smartphone, or may be a tablet terminal. Moreover, the wireless terminal may be a fixed type terminal having a wireless communication function. As examples of the terminal, there are a notebook type personal computer, a desktop type personal computer, a printer, a storage, a display such as a television, a smart speaker, audio equipment, and household equipment such as a refrigerator. Then, the wireless relay apparatus 130 connects the wireless terminal to a wired line (e.g. a LAN line) or a high-speed wireless communication line (e.g. an LTE or a local 5G line).

Note that, as illustrated in FIG. 3, a terminal group 126 is provided on one of side surfaces of the housing 120. The terminal group includes a terminal (hereinafter, referred to as a power supply terminal) for supplying power to the wireless relay apparatus 130. Moreover, a plurality of terminals are also provided on a surface, of side surfaces of the wireless relay apparatus 130, on the same side as the terminal group 126. One of the terminals is a terminal for inputting power. Then, the terminal is connected to a power supply terminal provided in the terminal group 126, via a power supply wiring 160. In other words, the wireless relay apparatus 130 is supplied with power from a power supply circuit 124 (refer to FIG. 2) inside the housing 120. In this way, when an outlet is connected to a main body of the information processing apparatus 10, power is also supplied to the wireless relay apparatus 130 from the outlet. Thus, the number of outlets needed near the information processing apparatus 10 is decreased.

Note that, when the terminal group 126 includes a terminal for communication (e.g. a terminal for Internet connection) and the wireless relay apparatus 130 is provided with an input terminal for the Internet, a communication circuit inside the housing 120 is connected to a wired line and a wireless terminal via the wireless relay apparatus 130, as illustrated in FIG. 6, by connecting the two terminals.

Moreover, as illustrated in FIGS. 2 to 5, note that, a pedestal 140 is provided on a lower surface of the housing 120. The pedestal 140 is wider than the lower surface of the housing 120. Thus, even when the display 110 and the wireless relay apparatus 130 are mounted to the housing 120, the housing 120 does not easily fall down.

Moreover, as illustrated in FIG. 5, a wall portion 128 is provided on the one surface 121 in such a way as to cover at least a part of the side surface of the wireless relay apparatus 130. Specifically, the wireless relay apparatus 130 has a plurality of side surfaces (e.g. four) of side surfaces. Then, the wall portion 128 covers two side surfaces that are coupled to each other, among the plurality of side surfaces.

In this way, the wireless relay apparatus 130 becomes difficult to see from external, and, when the wireless relay apparatus 130 is removed from the one surface 121, the wall portion 128 can be suppressed from interfering. Note that, in the example illustrated in the present figure, the wall portion 128 covers a surface facing downward, and one of surfaces facing laterally, among the side surfaces of the wireless relay apparatus 130.

Note that, as illustrated in FIG. 5, when the display 110 is rotated, the wireless relay apparatus 130 and the one surface 121 of the housing 120 can be exposed. Thereby, installation, removal, replacement, and maintenance of the wireless relay apparatus 130 can be performed without moving the information processing apparatus 10 or changing a direction of the information processing apparatus 10. This effect can be acquired even when the information processing apparatus 10 is fixed. Note that, when the hinge portion 156 has a lock mechanism, the display 110 can be fixed in a state of facing upward, and, therefore, this work can be performed more easily.

Then, when at least one portion (hereinafter, referred to as a lid portion) of the one surface 121 is removable, replacement of an electrical component (e.g. a component constituting the control unit 122 and a component constituting the power supply circuit 124) housed within the housing 120, and the like can be performed by removing the lid portion, as illustrated in FIG. 7. Thus, there is no need to move the information processing apparatus 10 or change a direction of the information processing apparatus 10, when performing maintenance of a component within the housing 120. This effect can be acquired even when the information processing apparatus 10 is fixed. Note that, when the hinge portion 156 has a lock mechanism, the display 110 can be fixed in a state of facing upward, and, therefore, this work can be performed more easily.

Note that, on the one surface 121, the lid portion does not include a portion to which the first member 152 (refer to FIG. 4) of the connection portion 150 is fixed. Moreover, the wireless relay apparatus 130 is mounted to the lid. Thus, it is preferable that the wireless relay apparatus 130 is removed from the lid portion before the lid portion is removed.

Figure 8:
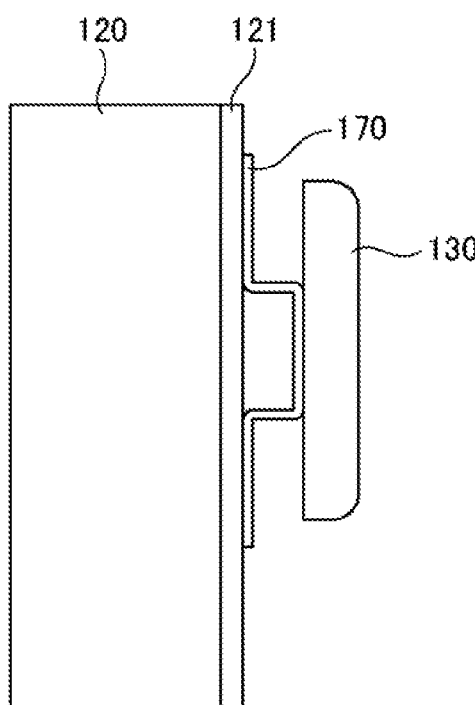
FIG. 8 is a view for describing a structure for mounting a wireless relay apparatus to one surface of a housing.
Figure 9:
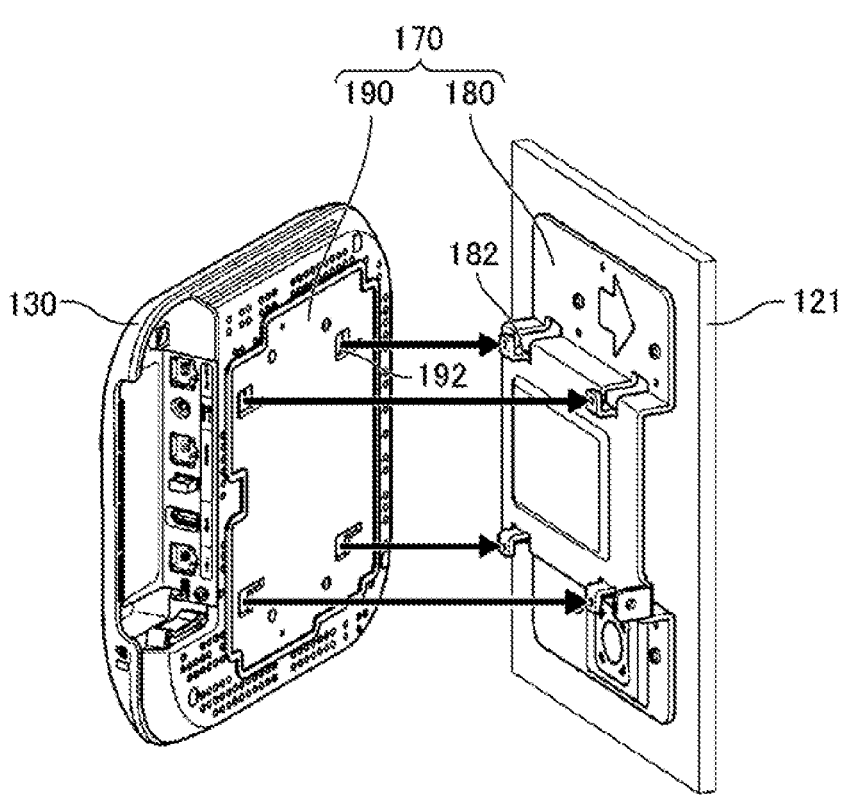
FIG. 9 is a view for describing one example of a structure of a fixing jig.

Next, a structure for mounting the wireless relay apparatus 130 to the one surface 121 of the housing 120 is described by use of FIGS. 8 and 9. As illustrated in FIG. 8, the wireless relay apparatus 130 is fixed to the one surface 121 by use of a fixing jig 170.

FIG. 9 is a view for describing one example of a structure of the fixing jig 170. In the example illustrated in the present figure, the fixing jig 170 includes a first member 180 and a second member 190. The first member 180 is fixed to the one surface 121, and the second member 190 is fixed to the radio relay apparatus 130. Then, the first member 180 is mountable to and detachable from the second member 190. In the example illustrated in the present figure, the first member 180 includes a hook 182, and the second member 190 has an opening 192. Then, the second member 190 is fixed to the first member 180 by inserting the hook 182 into the opening 192. Moreover, the second member 190 is removed from the first member 180 by removing the hook 182 from the opening 192.

FIG. 10 is a view illustrating a first example of a connection method for communication between the information processing apparatus 10 and an external apparatus. In the present figure and FIG. 11 described later, a dashed-dotted line or a solid line indicates connection using a wire. Then, at least one of a plurality of connections described dashed-dotted lines may be provided.

In the example illustrated in the present figure, a circuit inside the housing 120 is connected to at least one of the wireless relay apparatus 130, a HUB or a router (hereinafter, referred to as a HUB), and a wireless master unit via a cable. Then, the wireless master unit is connected to a HUB (or router) via a cable. The HUB (or router) is connected to a network (e.g. an in-store network) via a cable. Then, the wireless master unit is wirelessly connected to the wireless relay apparatus 130. Moreover, the wireless terminal described above is wirelessly connected to the wireless relay apparatus 130.

Then, the wireless terminal may be connect to the HUB via the wireless relay apparatus 130 and a circuit inside the housing 120, may be connected to the HUB via the wireless relay apparatus 130 and the wireless master unit, or may be connected to the HUB via the apparatus 130, the wireless master unit, and a circuit inside the housing 120.

FIG. 11 is a view illustrating a second example of a connection method for communication between the information processing apparatus 10 and an external apparatus. In the example illustrated in the present figure, a HUB (or a router) is connected to the network via a cable. Then, a circuit inside the housing 120 is connected to at least one of the wireless relay apparatus 130 and the HUB or a router (hereinafter, referred to as a HUB) via a cable. Then, the wireless relay apparatus 130 is connected to the HUB (or router) via a cable. In the example illustrated in the present figure, the wireless relay apparatus 130 functions as a wireless master unit. Note that, a wireless slave unit may be incorporated in the housing 120.

In this case, the wireless terminal may be connected to the HUB via the wireless relay apparatus 130 and a circuit inside the housing 120, or may be connected to the HUB via only the wireless relay apparatus 130.

Figure 12:
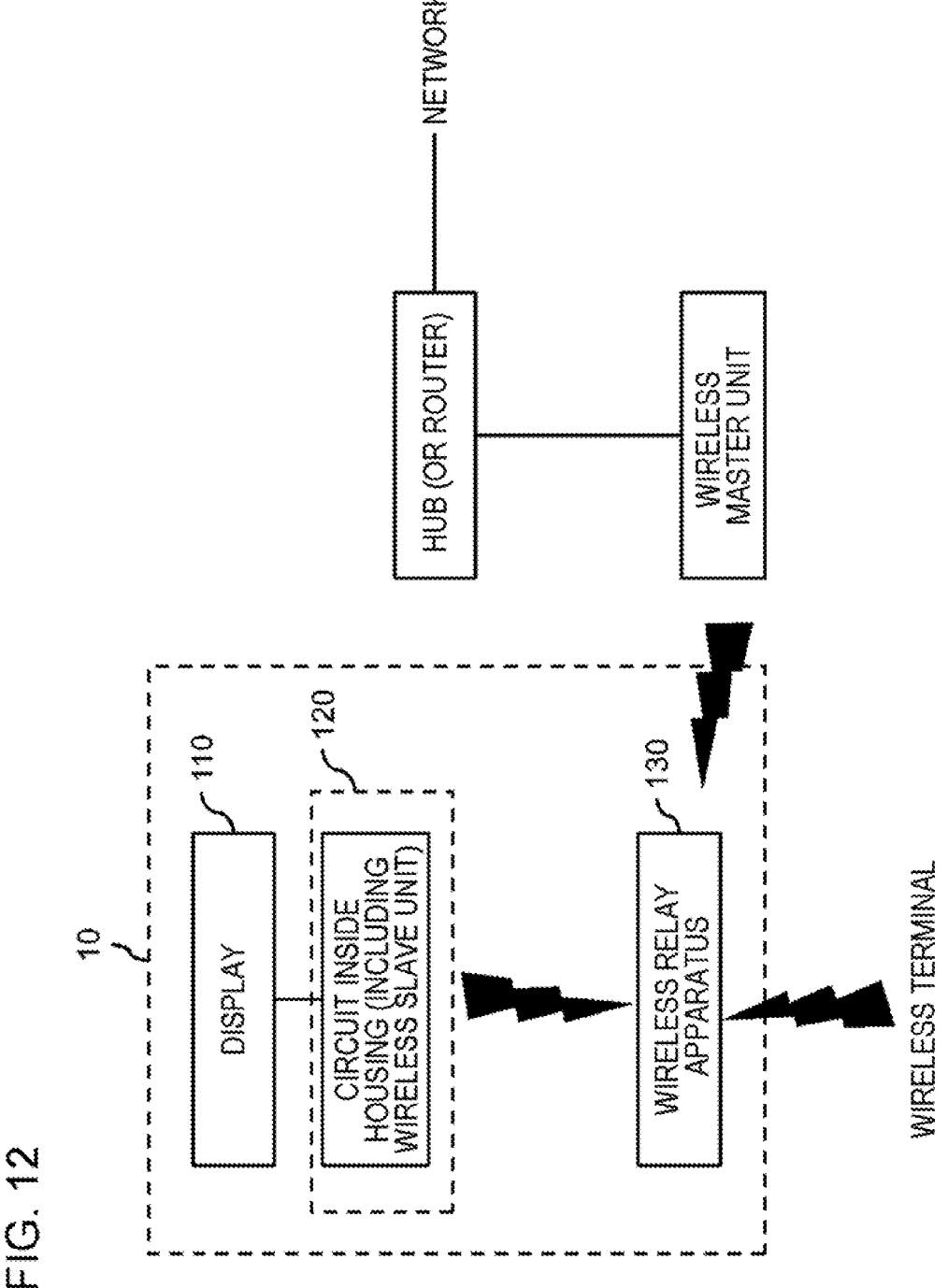
FIG. 12 is a view illustrating a connection example of the information processing apparatus and peripheral equipment.

FIG. 12 is a view illustrating a third example of a connection method for communication between the information processing apparatus 10 and an external apparatus. In the example illustrated in the present figure, a wireless slave unit is incorporated in the housing 120. The wireless relay apparatus 130 is wirelessly connected to the circuit inside the housing 120 and the wireless master unit. Then, the HUB is connected to the wireless master unit via a cable, and is also connected to the network via a cable.

In this case, the wireless slave unit inside the housing 120 and wireless terminal are connected to the HUB via the wireless relay apparatus 130 and the wireless master unit.

FIG. 13 is a view illustrating a fourth example of a connection method for communication between the information processing apparatus 10 and an external apparatus. The example illustrated in the present figure is similar to the example illustrated in FIG. 12, except that the wireless relay apparatus 130 is directly connected to a HUB with a cable. Note that, the wireless relay apparatus 130 functions as a wireless master unit. Then, a circuit inside the housing 120 and a wireless terminal are connected to the HUB via the wireless relay apparatus 130.

FIG. 14 is a view illustrating a fifth example of a connection method for communication between the information processing apparatus 10 and an external apparatus. The example illustrated in the present figure is similar to the example illustrated in FIG. 13, except that the wireless relay apparatus 130 is connected to a circuit inside the housing 120 with a cable.

Figure 15:
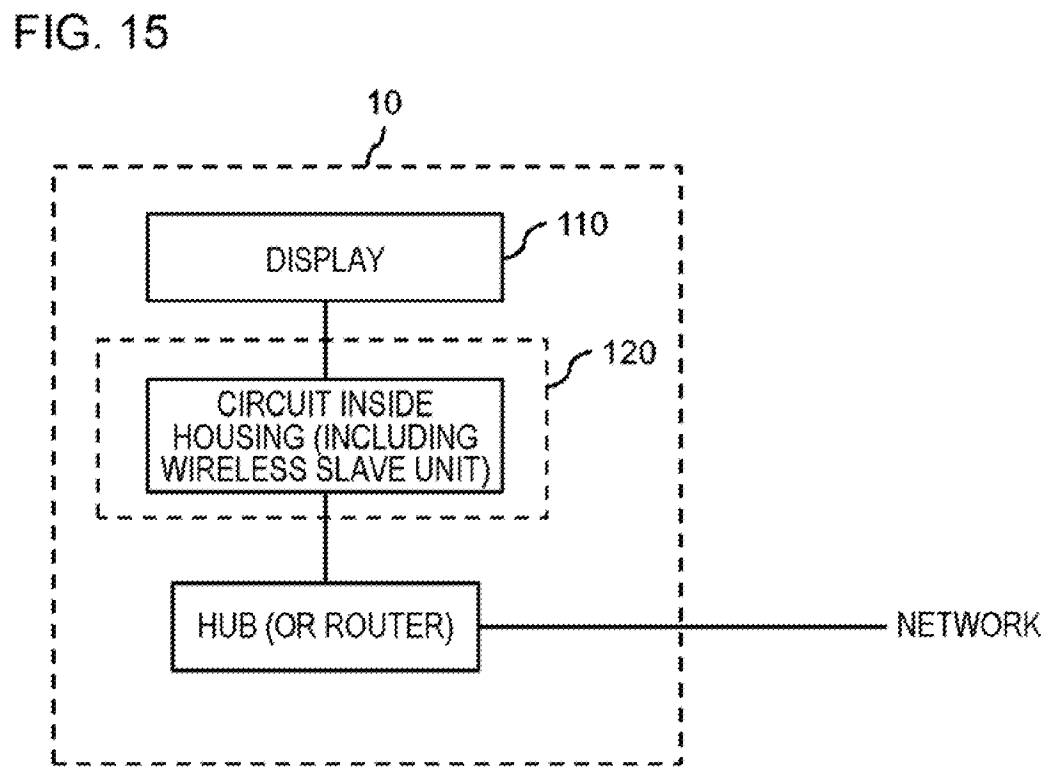

Note that, as illustrated in FIG. 15, as a modified example of FIG. 14, a HUB may be provided instead of the wireless relay apparatus 130. In this case, the HUB is connected to a network via a cable.

As described above, according to the present example embodiment, the display 110 and the wireless relay apparatus 130 are mounted to the surface of the housing 120 of the information processing apparatus 10. Thus, a space needed for installation of the display 110, the wireless relay apparatus 130, and the housing 120 can be made small.

Second Example Embodiment

Figure 16:
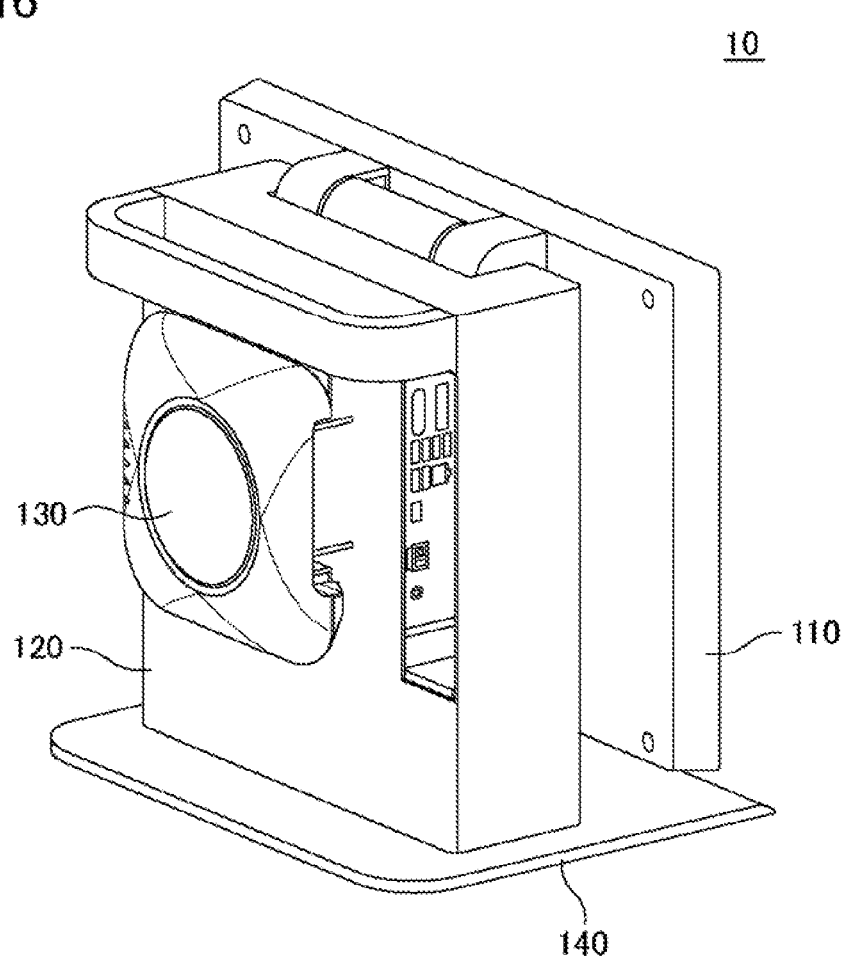
FIG. 16 is a view illustrating one example of a functional configuration of an information processing apparatus according to a second example embodiment.

FIG. 16 is a perspective view illustrating a configuration of an information processing apparatus 10 according to the present example embodiment. The information processing apparatus 10 illustrated in the present figure has a similar configuration to that of the information processing apparatus 10 according to the first example embodiment, except for a position of a wireless relay apparatus 130.

In the present example embodiment, the wireless relay apparatus 130 is mounted to a surface opposite to a display 110, in a surface of a housing 120. That is to say, when the information processing apparatus 10 is used, a surface of the housing 120 to which the wireless relay apparatus 130 is mounted is a rear surface. Note that, each of a surface of the housing 120 facing the display 110, and a surface to which the wireless relay apparatus 130 is fixed is the largest surface among side surfaces of the housing 120.

According to the present example embodiment as well, a space needed for installation of the display 110, the wireless relay apparatus 130, and the housing 120 can be made small, similarly to the first example embodiment.

While the example embodiments according to the present invention have been described above with reference to the drawings, the example embodiments are exemplifications of the present invention, and various configurations other than those described above can be also adopted.

Some or all of the above-described example embodiments can also be described as, but are not limited to, the following supplementary notes.

1. An information processing apparatus including:
   a housing;
   a display mounted to a housing;
   a control unit, housed inside a housing, that controls a display; and
   a wireless relay apparatus mounted to any surface in surfaces of the housing.
2. The information processing apparatus according to supplementary note 1, wherein
   the wireless relay apparatus is positioned between the display and the housing.
3. The information processing apparatus according to supplementary note 2, wherein
   the display is movably mounted relative to the housing.
4. The information processing apparatus according to supplementary note 3, wherein
   the display is rotatably mounted relative to the housing with one side of the display as a rotation axis.
5. The information processing apparatus according to supplementary note 3 or 4, wherein
   at least a part of a surface of the housing to which the wireless relay apparatus is mounted is removable.
6. The information processing apparatus according to supplementary note 1, wherein the wireless relay apparatus is mounted to a surface in an opposite side to the display, in a surface of the housing.
7. The information processing apparatus according to any one of supplementary notes 1 to 6, further comprising a power supply circuit provided inside the housing, wherein
   the wireless relay apparatus is supplied with power from the power supply circuit.
8. The information processing apparatus according to any one of supplementary notes 1 to 7, wherein
   the wireless relay apparatus connects a wireless terminal to a wired line.
9. The information processing apparatus according to any one of supplementary notes 1 to 8, further including
   a wall portion being provided on a surface of the housing to which the wireless relay apparatus is mounted, and covering at least a part of a side surface of the wireless relay apparatus.
10. The information processing apparatus according to supplementary note 9, wherein
   the wireless relay apparatus includes a plurality of side surfaces, and
   the wall portion covers two side surfaces that are coupled to each other among the plurality of side surfaces.

REFERENCE SIGNS LIST

10 Information processing apparatus
110 Display
120 Housing
121 One surface
122 Control unit
124 Power supply circuit
126 Terminal group
128 Wall portion
130 Wireless relay apparatus
140 Pedestal
150 Connection portion
152 First member
154 Second member
160 Power supply wiring
170 Fixing jig
180 First Member
182 Hook
190 Second member
192 Opening

What is claimed is:
1. An information processing apparatus comprising:
a housing;
a display mounted to the housing;
a central processing unit (CPU), housed inside the housing, that performs processing for controlling the display;
a wireless relay apparatus mounted to any surface in surfaces of the housing; and
a power supply circuit provided inside the housing, wherein
the power supply circuit is configured to supply power to the wireless relay apparatus.
2. The information processing apparatus according to claim 1, wherein
the wireless relay apparatus is positioned between the display and the housing.

3. The information processing apparatus according to claim 2, wherein the display is movably mounted relative to the housing.

4. The information processing apparatus according to claim 3, wherein the display is rotatably mounted relative to the housing with one side of the display as a rotation axis.

5. The information processing apparatus according to claim 3, wherein at least a part of a surface of the housing to which the wireless relay apparatus is mounted is removable.

6. The information processing apparatus according to claim 1, wherein the wireless relay apparatus is mounted to a surface of the housing, the display is mounted to another surface of the housing, and the another surface is an opposite side to the surface.

7. The information processing apparatus according to claim 1, wherein the wireless relay apparatus connects a wireless terminal to a wired line.

8. The information processing apparatus according to claim 1, further comprising a wall portion being provided on a surface of the housing to which the wireless relay apparatus is mounted, and covering at least a part of a side surface of the wireless relay apparatus.

9. The information processing apparatus according to claim 8, wherein the wireless relay apparatus comprises a plurality of side surfaces, and the wall portion covers two side surfaces that are coupled to each other among the plurality of side surfaces.

10. The information processing apparatus according to claim 1, wherein the display is mounted to a surface of the housing, the display faces another surface of the housing, the another surface of the housing comprises a lid portion that is removable, and the wireless relay apparatus is mounted to the lid portion of the another surface of the housing.

11. The information processing apparatus according to claim 1, further comprising a circuit inside the housing that is connected to the wireless relay apparatus via a cable.

12. The information processing apparatus according to claim 1, wherein the wireless relay apparatus functions as an access point, and the information processing apparatus further comprises a wireless client incorporated in the housing.

\* \* \* \* \*